US006244632B1

(12) United States Patent
Gasparini

(10) Patent No.: US 6,244,632 B1
(45) Date of Patent: Jun. 12, 2001

(54) CONNECTION ARRANGEMENT

(75) Inventor: Giacomo Salvatore Gasparini, East Kew. (AU)

(73) Assignee: Jott Australia Pty. Ltd., Victoria (AU)

( * ) Notice: Subject to any disclaimer, the term of this patent is extended or adjusted under 35 U.S.C. 154(b) by 0 days.

(21) Appl. No.: 09/214,503

(22) PCT Filed: Jul. 24, 1997

(86) PCT No.: PCT/AU97/00468

§ 371 Date: Mar. 8, 1999

§ 102(e) Date: Mar. 8, 1999

(87) PCT Pub. No.: WO98/04865

PCT Pub. Date: Feb. 5, 1998

(30) Foreign Application Priority Data

Jul. 24, 1996 (AU) .................................................. PO 1206

(51) Int. Cl.⁷ ................................................ F16L 21/00
(52) U.S. Cl. ........................ 285/401; 285/330; 285/921; 285/377
(58) Field of Search ..................................... 285/358, 360, 285/361, 362, 376, 377, 396, 401, 402, 322, 314, 913, 307, 921, 330

(56) References Cited

U.S. PATENT DOCUMENTS

| 744,788 | * | 11/1903 | Wigton et al. ...................... 285/330 |
| 939,436 | * | 11/1909 | McVoy ................................. 285/330 |
| 1,031,587 | * | 7/1912 | Resik .................................... 285/330 |
| 1,054,812 | * | 3/1913 | Zierath ................................. 285/330 |
| 3,588,149 | * | 6/1971 | Dembler, Sr. et al. . |
| 4,786,085 | | 11/1988 | Sauer et al. . |
| 4,887,849 | | 12/1989 | Briet . |

FOREIGN PATENT DOCUMENTS

| 2331670 | 6/1972 | (AU) . |
| 3655071 | 6/1973 | (AU) . |
| 4245672 | 11/1973 | (AU) . |
| 7517874 | 5/1976 | (AU) . |
| 3442327 | 7/1986 | (DE) . |
| 334717 | 9/1989 | (EP) . |
| 2658899 | 8/1991 | (FR) . |
| 2742518 | 6/1997 | (FR) . |
| WO 96/04502 | * 2/1996 | (WO) . |

* cited by examiner

Primary Examiner—B. Dayoan
Assistant Examiner—Tomlyne A Malcolm

(57) ABSTRACT

This invention provides a connector for coupling a male and a female component, the connector including a member for locating the female component with respect to the male component and a locking member for coupling the female component to the male component. The locking member rotates with respect to the locating member in order to provide for the coupling and uncoupling of the components.

18 Claims, 5 Drawing Sheets

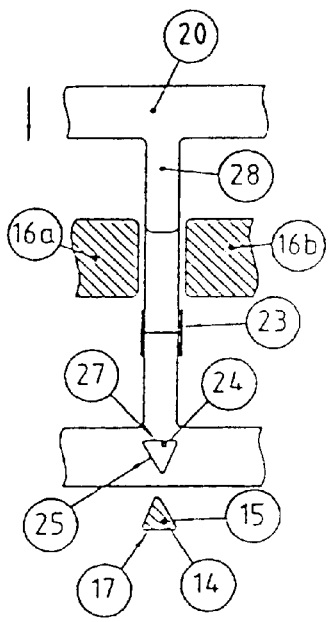
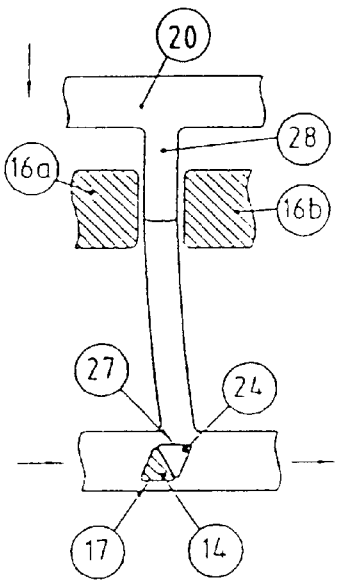
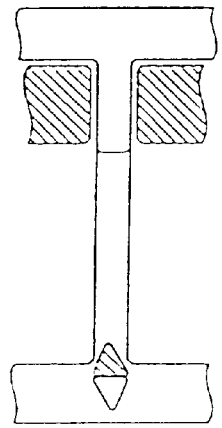
FIG. 6a     FIG. 6b     FIG. 6c
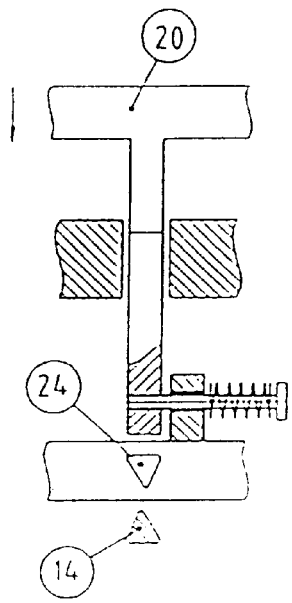
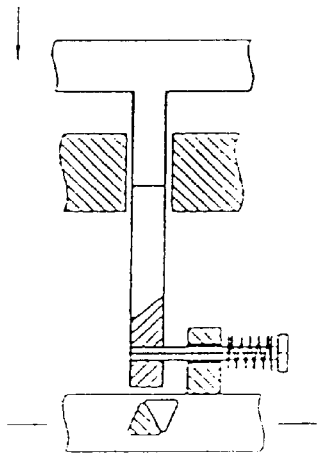
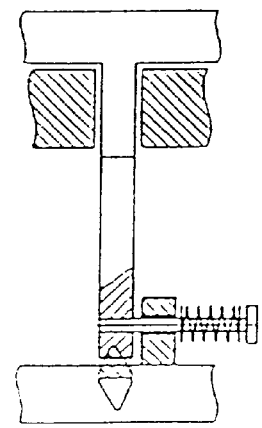
FIG. 7a     FIG. 7b     FIG. 7c

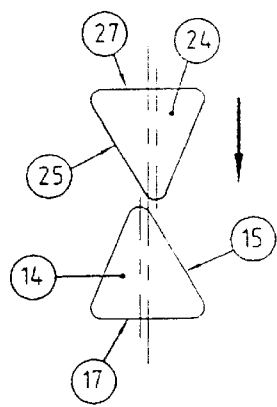
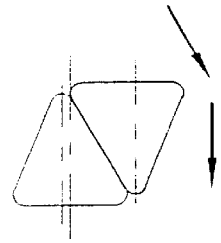
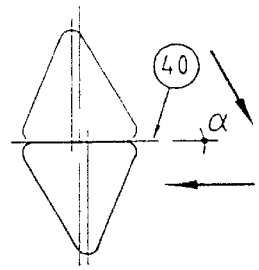
FIG. 8a    FIG. 8b    FIG. 8c
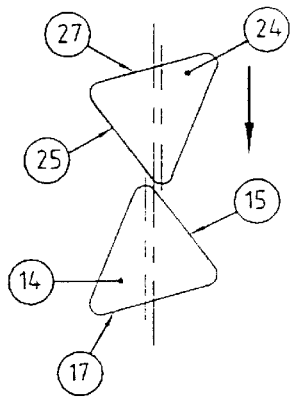
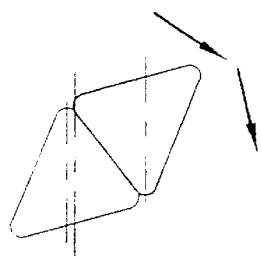
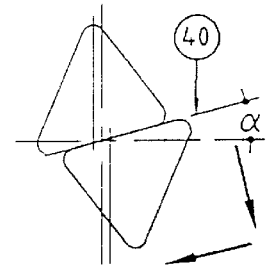
FIG. 9a    FIG. 9b    FIG. 9c
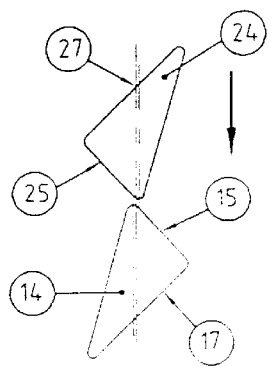
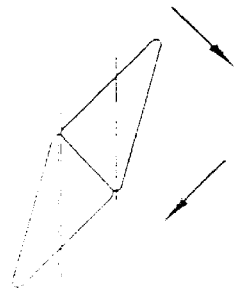
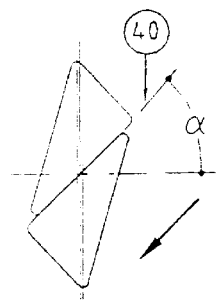
FIG. 10a    FIG. 10b    FIG. 10c

CONNECTION ARRANGEMENT

This application is the national phase under 35 U.S.C. §371 of prior PCT International Application No. PCT/AU97/00468 which has an International filing date of Jul. 24, 1997 which designated the United States of America, the entire contents of which are hereby incorporated by reference.

FIELD OF THE INVENTION

The present invention relates to a connector for coupling objects together, and in particular relates to a connector for the coupling of a male and female component by means of an improved snap fit type action.

BACKGROUND TO THE INVENTION

There are many forms of connectors for the coupling of male and female components by means of a snap fit action. Such connectors comprise one or more connecting elements such as lugs or projections on one component which engage upon or with the other component. Such connectors sometimes rely upon deformation of the connecting elements during the coupling process, or alternatively upon the radial movement of the connecting elements during the coupling process. However, whilst such connectors can provide for the easy coupling of the male and female components, the connectors may also be prone to being inadvertently uncoupled.

It is therefore an object of the present invention to provide an improved connector for coupling male and female components which enables the male and female components to be easily coupled by means of a snap fit action and which also safeguards against the components being inadvertently uncoupled.

SUMMARY OF THE INVENTION

The present invention therefor provides a connector for coupling a male component and a female component, said connector including:

guide means adapted to permit relative movement of the male and female components in an axial direction when said components are at least partially axially engaged;

locking means for locking the female component to the male component;

wherein during coupling of said components said locking means is adapted to rotate with respect to said guide means to a position permitting said axial relative movement and on completion of coupling to rotate a position in which said male and female components are locked together.

Preferably the connector for coupling a male and a female component, said connector including:

means for locating the female component with respect to the male component; which does not permit other than axial movement of the male and female components when the components are at least partially engaged;

means for locking the female component to the male component which is adapted to rotate with respect to the locating means during the coupling and uncoupling of the components.

Preferably the locking means are provided on the male component which cooperate with locking means on the female component.

Preferably the locking means includes one or more locking lugs on the male component which cooperate with one or more corresponding locking lugs on the female component.

Preferably the means for locating the female component with respect to the male component includes one or more projections or grooves on the female component which cooperate with one or more corresponding projections or grooves on the male component.

Preferably the said male and female components are connected along an axis and said locking means is adapted to rotate in a plane perpendicular to said axis.

Preferably the said locking means is adapted to rotate about said axis.

Advantageously, the present invention provides a connector which does not rely upon radial distortion or movement of the locking elements during either coupling or uncoupling of the male component and female component.

This form of connector can provide for the easy coupling of two objects whilst also safeguarding against the inadvertent separation of the objects when coupled together. Furthermore, one preferred form of the present invention provides for the permanent connection of the male and female components so as to prevent uncoupling of the components. An alternative preferred form of the present invention provides for the connection of the male component and female component which is lockable but which can be released to provide for the uncoupling of the components. A further preferred form of the invention provides for the connection of the male and female components such that they can be released by an axial pulling action in order to uncouple the male and female components when a predetermined force is reached.

Preferably the male component and female component are connected along an axis and preferably said locking means adapted to allow the rotation of the locking means in a plane perpendicular to said axis. It is further preferable that said locking means is adapted to rotate about said axis.

Preferably locking means are provided on the male component which cooperate with locking means on the female component.

Preferably the locking means includes one or more locking lugs on the male component which cooperate with one or more corresponding locking lugs on the female component.

Preferably the means for locating the female component with respect to the male component does not permit other than axial movement of the male and female components when the components are at least partially engaged.

It is further preferable that the means for locating the female component with respect to the male component comprises one or more projections or grooves on the female component which cooperate with one or more corresponding projections or grooves on the male component.

In one preferred form of the invention the female member is provided with an annular skirt or ring upon the inner surface of which are provided said locking elements in the form of grooves and/or projections. The skirt or ring is adapted so as to prevent radial movement of the locking elements.

Preferably the male member is provided with a cylindrical outer surface over which the female member is to be located, the cylindrical outer surface of the male member being provided another locking means in the form of grooves and/or projections, said grooves and/or projections on the female member and the male member being adapted to cooperate such that the female member is fitted to the male member by a snap fit action.

BRIEF DESCRIPTION OF DRAWINGS

Preferred embodiments of the invention will now be described with reference to the accompanying drawings in which:

FIGS. 6a, 6b, 6c are partial sectional views along line "A" in FIGS. 4 & 5 and illustrate one embodiment of the locking mechanism of a connector made according to the present invention.

FIGS. 7a, 7b, 7c are sectional views corresponding to FIGS. 6a, 6b, 6c which illustrate an alternative embodiment of the locking mechanism of a connector made according to the present invention.

FIGS. 8a to 8c illustrate one configuration of the locking mechanism of a connector made according to the present invention.

FIGS. 9a to 9c illustrate an alternative configuration of the locking mechanism of a connector made according to the present invention.

FIGS. 10a to 10c illustrate a further alternative configuration of the locking mechanism of a connector made according to the present invention.

In the drawings, like numbers refer to like parts.

DESCRIPTION OF PREFERRED EMBODIMENT

General

Figure 1:
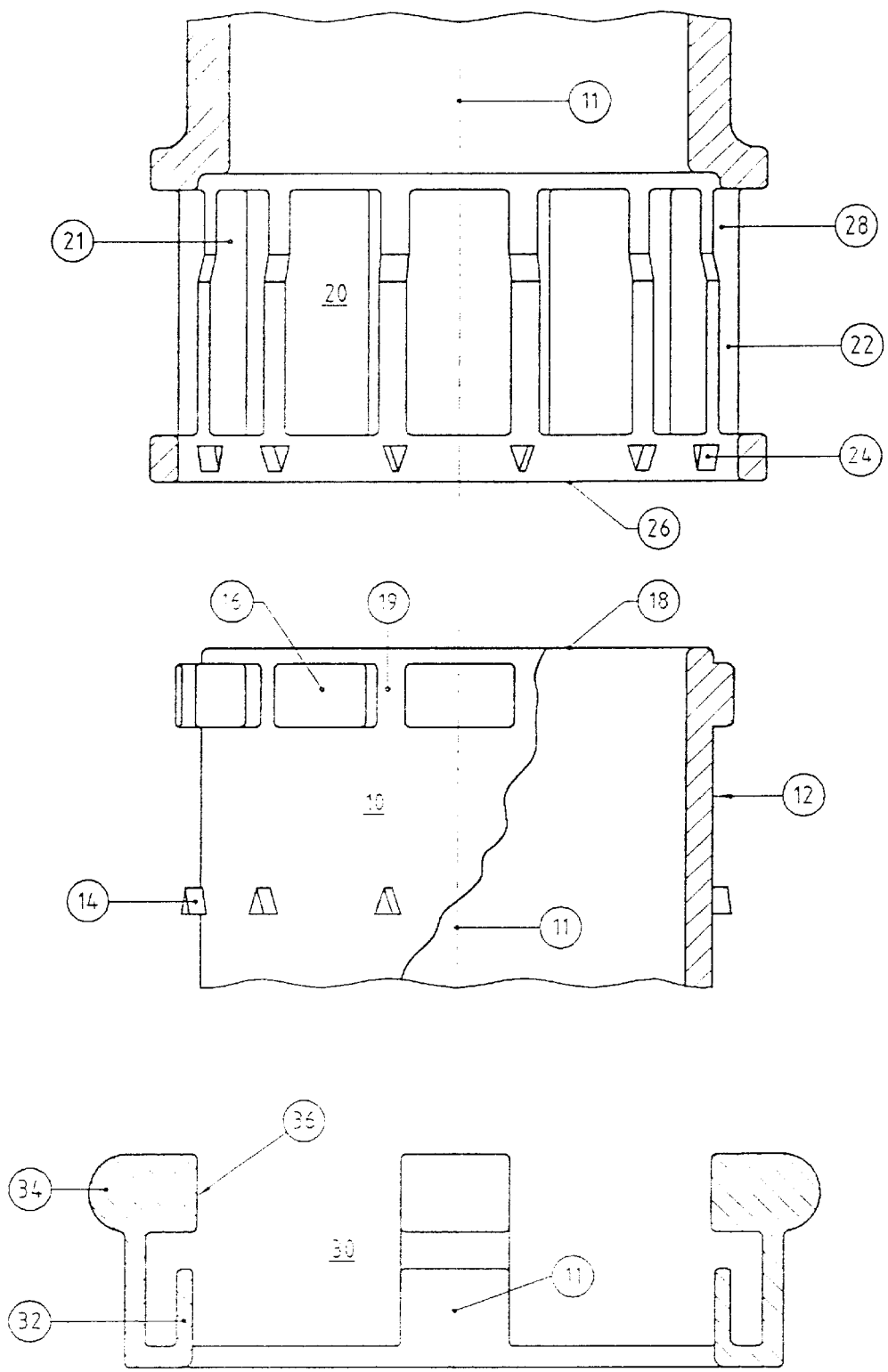
FIG. 1 is an exploded sectional side view of a preferred embodiment of the connection mechanism of the present invention, comprising a female coupling member, a corresponding male coupling member, and an additional locking device.

Referring generally to FIGS. 1 to 5, there is shown a preferred form of connector the male member 10 includes a cylindrical outer wall 12, the surface of which is provided with locating/guiding means in the form of a series of male guide projections 16 which are spaced around the outer circumference of the outer wall 12 so as to define gaps or male guide recesses 19 therebetween. In the embodiment depicted in FIG. 1, the male guide projections 16 are located proximate the outer end 18 of the male member 10.

Whilst the male member 10 and female member 20 depicted in FIG. 1 are hollow, it should be noted that the male member 10 may also be solid.

Figure 4:
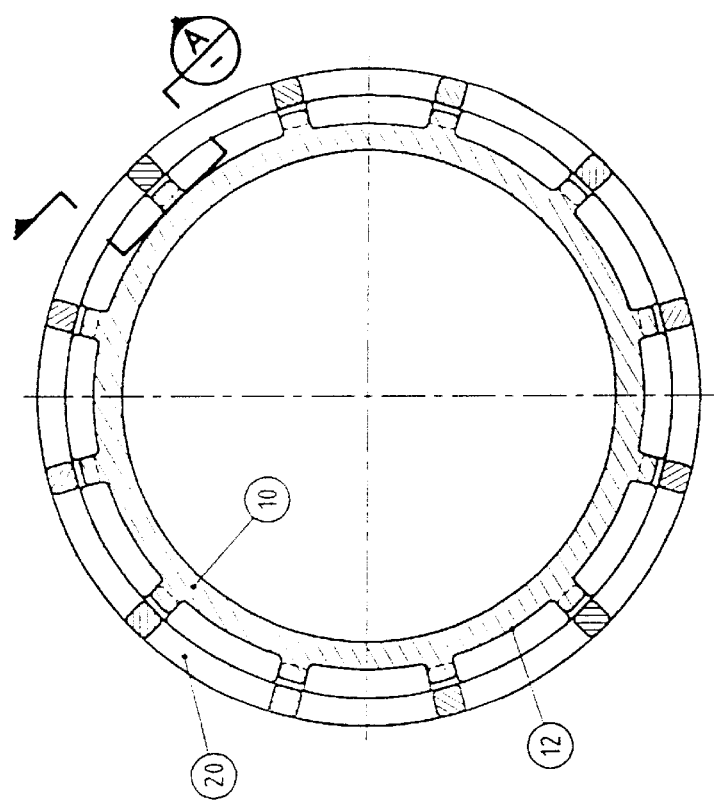
FIG. 4 is a sectional axial view of the connector taken along line "B" in FIG. 2.
Figure 5:
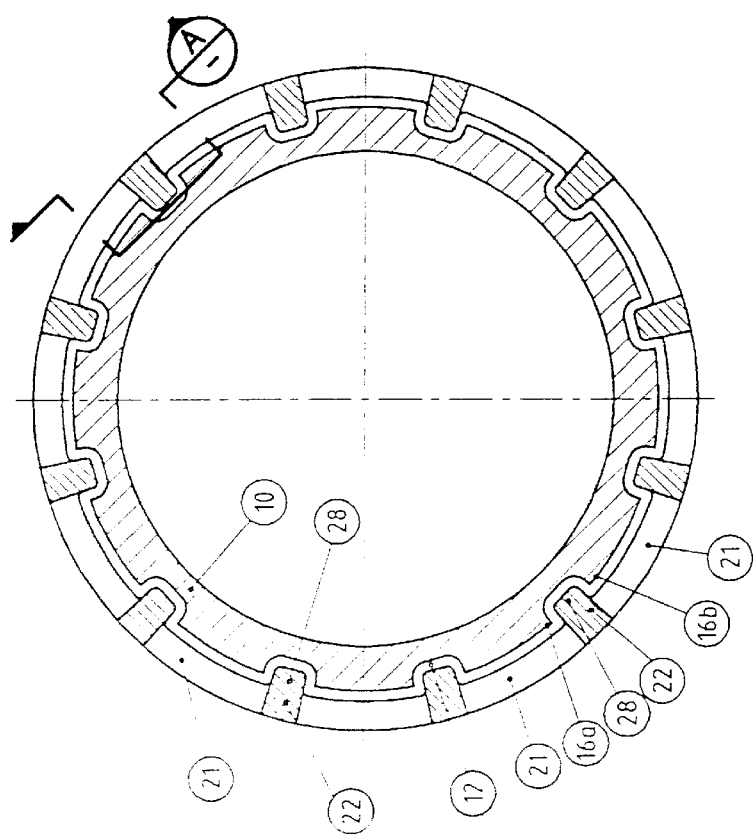
FIG. 5 is a sectional axial view of the connector taken along line "C" in FIG. 2.

The corresponding female member 20 includes a cylindrical skirt (inner wall) 22, which is provided with locating/guide means in the form of female guide projections 28 which are located away from the open end or mouth 26 of the female member 20. In the embodiment depicted the female guide projections 28 extend in an axial direction down the cylindrical skirt (inner wall) 22 of the female member 20. As is best illustrated in FIG. 4, a series of female guide projections 28 are located around the cylindrical skirt (inner wall) 22 of the female member 20. The series of projections 28 defines a series of female guide recesses 21.

Guide Means

Figure 3:
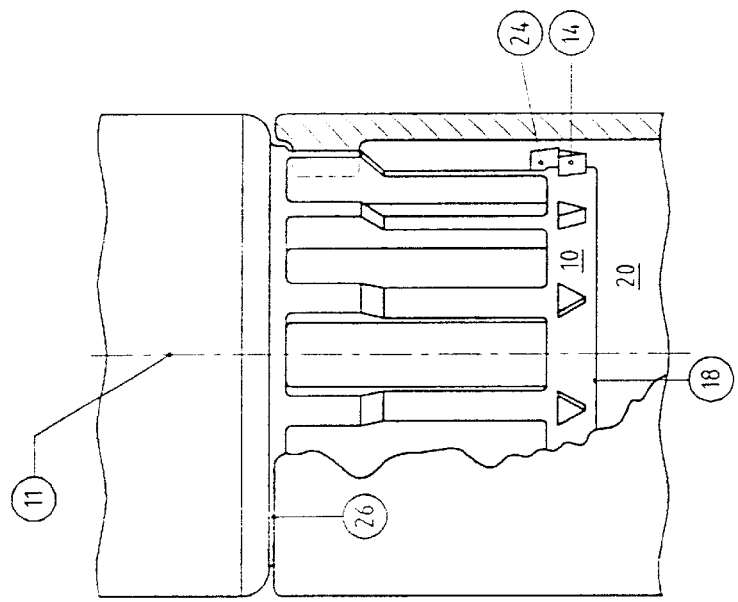
FIG. 3 is a sectional side view of a female member coupled to a male member by means of an alternative preferred embodiment of a connector of the present invention.
Figure 2:
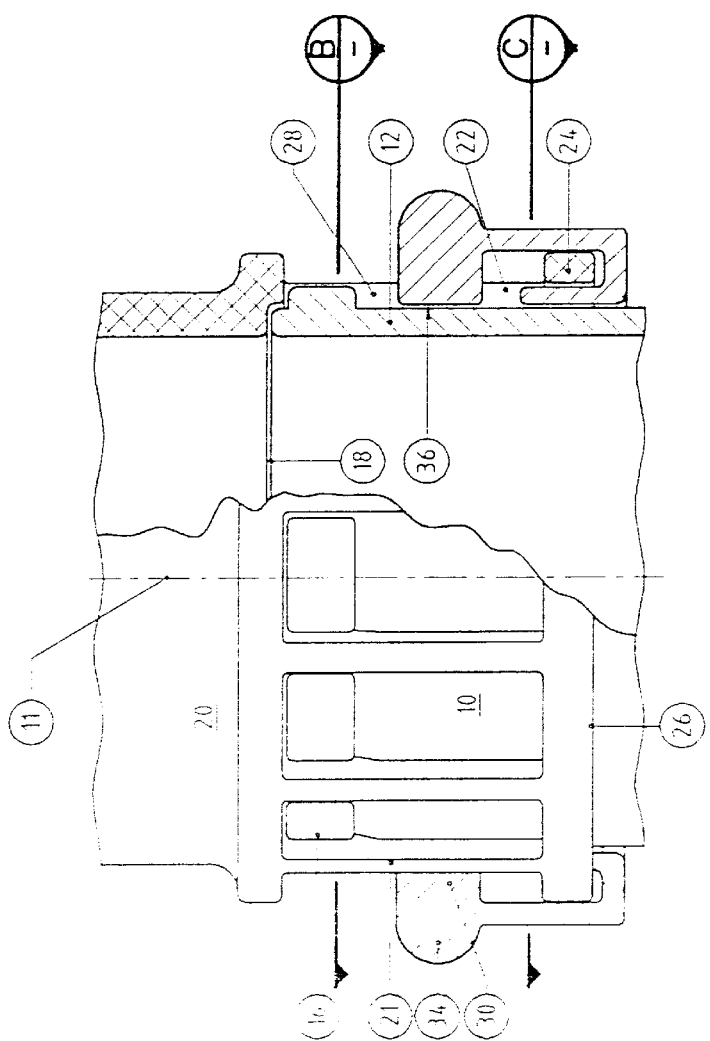
FIG. 2 is a sectional side view of a female member coupled to a male member by means of the embodiment of FIG. 1.

As shown in FIGS. 1, 2 and 3 the male and female members are connected along a longitudinal axis 11. Upon fitting the female member 20 to the male member 10, the female guide projections 28 on the inner surface of the female member 20 pass neatly through the gaps or male guide recesses 19 defined by the male guide projections 16a, 16b etc., on the outer wall 12 of the male member 10. The arrangement does not permit any substantial movement other than axial of the male and female components when the components are at least partially engaged.

It should be appreciated that the inverse arrangement is possible, namely two guide projections defining a gap therebetween can be provided on the inside surface of the female member 20 whilst a cooperating projection is provided on the outer surface 12 of male member 10. Alternatively, rather than using guide projections the same function could be achieved by providing appropriately located grooves in the outer surface 12 of the male member and/or the inner surface of the female member 20.

In addition, the said grooves or guides can be arranged to allow only one possible dual alignment of the male and female components.

Locking Means

Cooperating locking means in the form of male locking lugs 14 are provided on the outer surface of the male member 10 and female locking lugs 24 are provided on the inner surface of the female member 20. One or more of locking lugs 24 are provided on the inside surface of the skirt of the female member 20 at a location proximate the mouth 26 of the female member 20. Similarly, one or more locking lugs 14 are provided on the outside surface of the male member 10 at a location which will result in the respective locking lugs 14 and 24 cooperating to restrain the female member 20 on the male member 10 when the female member 20 is fully fitted.

Locking Member

Referring to FIGS. 1 and 2, in particular there is shown a further preferred feature of the present invention. A locking member 30 may be employed in applications where there is a need to ensure positive locking between the male and female members, or where a degree of tamper proofing of the connection is desired. In the preferred embodiment depicted the locking member 30 takes the form of an annular sleeve or collar which is engaged on the female member 20 by means of a lug 36 which is located in a corresponding outer female guide recess 21 in the wall 22 of the female member 20. In an alternative embodiment the locking member 30 may be engaged with the male member 10. A tab 34 is provided to enable the user to easily manipulate the locking member between its locked and unlocked positions. The locking member 30 includes one or more fingers 32 which are adapted to be located between the male and female members and to restrict the turning movement of the female member 20 relative to the male member 10 and thereby prevent decoupling of the members. The positioning of a finger 32 when in the locked position is illustrated in FIG. 2.

Alternative Embodiment

Referring to FIG. 3 in particular, an alternative configuration of the guide means and locking means is depicted. In this arrangement the female guide projections 28 on the female member 20 are located proximate the mouth 26 of the female member 20 and the locking lugs 24 are located away from the mouth 26. Conversely, the locking lugs 14 of the male member 10 are located proximate its end 18 whilst the male guide projections 16 are located away from the end 18. During the coupling the locking lugs 14 of the male member pass over the locking lugs 24 of the female member 20. If the torsional rigidity of the side wall 22 of the female member 20 is sufficient, this form of connection will prevent any unlocking of the coupling. This embodiment of the invention may be employed in applications such as the permanent coupling of pipes and the like. In applications where the male and female members are conduits for a fluid, a suitable seal may be incorporated into the coupling to provide for sealing between the male and female members in the zone of the coupling.

Alternative Locking Means Detail

Referring to FIGS. 6a, 6b, and 6c the operation of one set of cooperating guiding and locking guide projections of the connection mechanism will now be described.

In order to couple the male and female members the female guide projection 28 on the inside surface of the female member 20 is brought into alignment with the gap 23 between the two male guide projection 16a, 16b on the outer surface 12 of the male member 10. When the projection 28 on the female member 20 is aligned with the gap 23 between the male guide projection 16a, 16b on the male member 10 the locking lug 24 on the female member 20 and the locking lug 14 on the male member 10 are in proximity to each other. In this position the locking lugs 14 and 24 are not in direct axial alignment but are slightly offset as illustrated in FIG. 8a.

To fit the female member 20 to the male member 10 a force is applied in the axial direction so as to result in the relative movement of the female member 20 over the male member 10 as indicated by the arrow in FIG. 6a. As the female member 20 moves over the male member 10 the respective outer surfaces 15, 25 of the locking lugs 14 and 24 come into contact. The outer surfaces 15, 25 of the locking lugs have a plane of contact which is at an angle relative to the direction in which the force is applied. Further force results in the two surfaces 15, 25 of the locking lugs 14 and 24 sliding over each other. This relative movement under the action of the axial force gives rise to rotational movement of the skirt of the female member 20 in a plane perpendicular to the axis of the connection as indicated by the arrows in FIG. 6b, whilst the upper end of the female member 20 is restrained from rotational movement by the location of the projection 28 on the inner surface of female member 20 between the male guide projections 16a, 16b on the male member 10. In the embodiment depicted in FIGS. 6a, 6b, and 6c the rotational movement of the skirt of the female member 20 arises from a degree of elastic rotational deflection in the skirt of the female member 20. The skirt 22 of the female member 20 may be provided with one or more guide recesses, such as axially extending female guide recesses 21, in order to provide sufficient torsional flexibility in the skirt.

Once the surface 25 of the locking lug 24 has passed over the surface 15 of locking lug 14 the torsional stress in the female member 20 is released and the locking lug 24 on the female member 20 will snap back to a position beneath locking lug 14 on the male member 10. When fitted, locking of the female member 20 on the male member 10 is provided by the location of the lug 24 of the female member 20 in relation to the lug 14 on the male member 10 as illustrated in FIG. 6c.

In the embodiment depicted by FIGS. 6a, 6b and 6c when the female member 20 is coupled to the male member 10 the application of a direct axial force to pull the female member 20 away from the male member 10 will not uncouple the female member 20 from the male member 10. The skirt of the female member 20 is designed so as to ensure that the locking lugs 14 and 24 cannot disengage radially. Therefore in order to remove the female member 20 from the male member 10 it is necessary to apply a twisting (torsional) force to the skirt of the female member 20 in order to move locking lug 24 laterally relative to locking lug 14 so as to clear the lower surface 17 of locking lug 14. Once the locking lugs 14 and 24 are clear, the application of an axial force will result in removal of the female member 20 from the male member 10.

In an alternative form of the invention the skirt of the female member 20 may be of sufficient torsional rigidity so that during the coupling process there is no rotational movement of the portion of the female member 20 carrying the locking lugs 24. In this embodiment the rotational movement is provided by torsional flexure in the male member 10 such that the portion of the male member 10 carrying the locking lugs 14 undergoes rotational movement during coupling.

In a further alternative embodiment, both the male and female members may be provided with a degree torsional flexure such that the portions of both the male and female members which carry the locking lugs 14 and 24 respectively undergo rotational movement during the coupling process.

FIGS. 7a, 7b, and 7c illustrate the operation of another alternative embodiment of the connection mechanism, wherein rather than relying upon flexure in the skirt of the female member 20, a mechanical biasing arrangement is employed. In this embodiment the portion the female member 20 which carries the locking lug 24 is separate from that portion of the female member 20 which carries the female guide projection 28 and can rotate with respect thereto. A biasing means, such as one or more springs, act between the two portions of the female member 20.

In this embodiment, as the female member 20 moves over the male member 10 the respective outer surfaces 15, 25 of the locking lugs 14 and 24 come into contact. The outer surfaces 15, 25 of the locking lugs have a plane of contact which is at an angle relative to the direction in which the force is applied. Further force results in the two surfaces 15, 25 of the locking lugs 14 and 24 sliding over each other. This relative movement under the action of the axial force gives rise to rotational movement of the skirt of the female member 20 as indicated by the arrows in FIG. 7b whilst the upper end of the female member 20 is restrained from movement by the location of the projection 28 on the inner surface of female member 20 between the male guide projections 16a, 16b on the male member 10. In the embodiment depicted in FIGS. 7a, 7b, and 7c the rotational movement of the skirt of the female member 20 arises from the rotation of the skirt of the female member 20 against the action of the spring.

Once the surface 25 of the locking lug 24 has passed over the surface 15 of locking lug 14 the spring acts to rotate the skirt such that the locking lug 24 on the female member 20 moves back to a position beneath locking lug 14 on the male member 10. When fitted, locking of the female member 20 on the male member 10 is provided by the location of the lug 24 of the female member 20 beneath the lug 14 on the male member 10 as illustrated in FIG. 7c.

Similarly, an alternative embodiment of this form of the invention is to provide the locking lugs of the male member 10 on a biased, rotatable portion such as a ring. A further possible alternative is to provide both the male and female members with biased rotatable rings upon which the respective cooperative locking lugs are provided.

Referring to FIGS. 8a to 8c, 9a to 9c, and 10a to 10c it is possible to vary the degree of force required to in order to couple the male and female members and to also vary the degree of locking provided by the mechanism once the male and female members have been coupled. As described, during coupling of the female member to the male member 10 the outer surfaces 15, 25 of the locking lugs 14 and 24 have a plane of contact which is at an angle relative to the direction of relative movement of the male and female members. By varying the angle of the plane of contact the degree of force required to couple the members can be varied. This may also be varied by varying the sizing of the lugs and also by varying the axial offset of the lugs.

Furthermore, when the locking lugs 14 and 24 are in the locked position the surfaces 17, 27 of the lugs have a plane of contact 40. The angle between the plane of contact 40 of the locking lugs and the axial plane of the connection of the male and female members, α, influences the locking action of the lugs 14 and 24. For example, by varying the angle α it is possible to provide an arrangement wherein there is a degree of "self locking" between the locking lugs 14 and 24. That is, the locking lugs will tend to move to relative positions which provides a greater degree of locking.

It should also be noted that the angle between the plane of contact 40 of the locking lugs and the axial plane of the male and female members influences the amount of force required to uncouple the members. In the embodiments depicted the angle α represents the angle between the plane of contact of the locking lugs and a plane orthogonal to the axial plane of the male and female members. Thus, in the embodiment depicted in FIGS. 10a to 10c where angle α is larger than for the embodiment depicted in FIGS. 9a to 9c, the force required to uncouple the members is less. Thus by varying the angle α it is possible to design a coupling which can be uncoupled by the application of an axial force without the need for the user to also provide an additional external twisting force to the male or female locking components.

The present invention can be used in numerous applications. For example, it may be utilized as a coupling mechanism for conduits such as hoses, pipes and the like, or for connecting cables, including electrical cables. It may also be used as a closure arrangement for containers and the like.

What is claimed is:

1. A connector for coupling a male and a female component, said connector including:
   guide means adapted to permit relative movement of the male and female components in an axial direction when said components are at least partially axially engaged; and
   locking means for locking the female component to the male component;
   wherein during coupling of said components said locking means is arranged to rotate with respect to said guide means to a position permitting said axial relative movement and on completion of coupling to rotate to a position in which said male and female components are locked together, said locking means being provided on one of said male and female components and wherein during said axial relative movement said locking means is rotated by the other of said male and female components.

2. The connector according to claim 1, wherein said locking means includes at least one locking lug and said second locking means includes at least one locking lug adapted to cooperate in said locked condition with a locking lug of said locking means.

3. The connector according to claim 2, wherein cooperating locking lugs of said locking means and said second locking means have faces inclined to said axial direction and which slide against each other during coupling thereby to rotate said locking means.

4. The connector according to claim 3, wherein said locking means are secured to said female component.

5. The connector according to claim 2, wherein said locking means are secured to said female component.

6. The connector according to claim 1, wherein said guide means includes at least one projection on one of said male and female components and a cooperating recess or groove on the other of said male and female components.

7. The connector according to claim 6, wherein said locking means are secured to said female component.

8. The connector according to claim 1, wherein rotation of said locking means during coupling is about an axis parallel to said axial direction.

9. The connector according to claim 8, wherein said locking means are secured to said female component.

10. The connector according to claim 1, wherein said locking means are secured to said female component.

11. A connector for coupling a male and a female component, said connector including:
    guide means adapted to permit relative movement of the male and female components in an axial direction when said components are at least partially axially engaged; and
    locking means for locking the female component to the male component;
    wherein during coupling of said components said locking means is arranged to rotate with respect to said guide means to a position permitting said axial relative movement and on completion of coupling to rotate to a position in which said male and female components are locked together, said locking means being provided on one of said male and female components and in a locked condition of the connector cooperates with second locking means on the other of said male and female components.

12. The connector according to claim 11, wherein said locking means are secured to said female component.

13. A connector for coupling a male and a female component, said connector including:
    guide means adapted to permit relative movement of the male and female components in an axial direction when said components are at least partially axially engaged; and
    locking means for locking the female component to the male component;
    wherein during coupling of said components said locking means is arranged to rotate with respect to said guide means to a position permitting said axial relative movement and on completion of coupling to rotate to a position in which said male and female components are locked together, said locking means being secured to one of said male and female components by resilient means.

14. The connector according to claim 13, wherein said resilient means acts when said male and female components are fully axially engaged to urge said locking means towards a position in which said male and female components are locked together.

15. The connector according to claim 14, wherein said resilient means includes a plurality of axially extending legs adapted to bend transversely to their length during coupling of said male and female components.

16. The connector according to claim 15, wherein said locking means and said resilient means are integrally formed.

17. The connector according to claim 14, wherein said locking means and said resilient means are integrally formed.

18. The connector according to claim 13, wherein said locking means and said resilient means are integrally formed.

* * * * *